Figure 1:
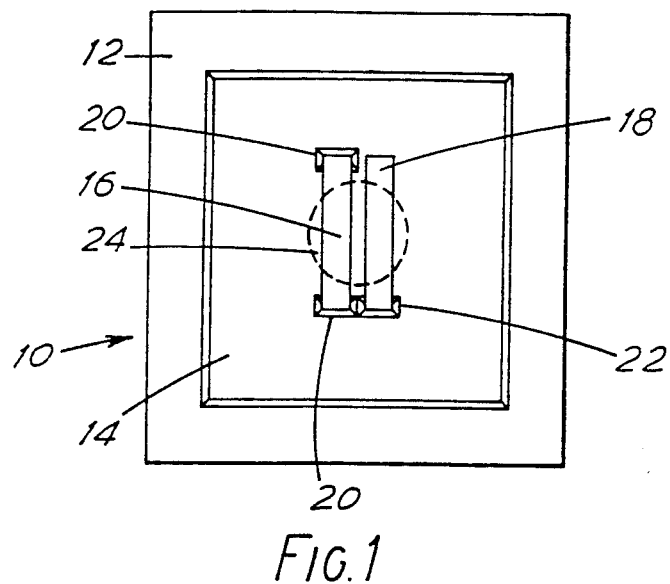

United States Patent [19]

Willson

[11] Patent Number: 4,972,076

[45] Date of Patent: Nov. 20, 1990

[54] SOLID STATE SENSOR WITH DUAL RESONANT VIBRATABLE MEMBERS

[75] Inventor: Jolyon P. Willson, Andover, England

[73] Assignee: Schlumberger Industries Limited, Farnborough, Hampshire, United Kingdom

[21] Appl. No.: 409,902

[22] Filed: Sep. 20, 1989

[30] Foreign Application Priority Data

Sep. 29, 1988 [GB] United Kingdom ............... 8822877
Aug. 30, 1989 [GB] United Kingdom ............... 8919573

[51] Int. Cl.$^5$ .............................................. H01J 5/16
[52] U.S. Cl. .............................. 250/227.21; 73/862.59
[58] Field of Search ...................... 250/227.21, 231.10; 73/632, 651, 653–657, 777, 778, 800, 862.59

[56] References Cited

U.S. PATENT DOCUMENTS 4,713,540 12/1987 Gilby et al. ..................... 250/227.21
4,772,786 9/1988 Langdon ........................... 73/862.59
4,897,541 1/1990 Philips ............................ 250/227.21

Primary Examiner—David C. Nelms
Attorney, Agent, or Firm—Sanford J. Asman

[57] ABSTRACT

A solid state sensor, micromachined in silicon, comprises first and second beams which can be optically excited into resonant vibration. The first beam is arranged to be acted upon by a diaphragm, so that the tension in it, and therefore its resonant frequency, is affected by the pressure applied to the diaphragm. The second beam is provided for temperature correction purposes, and to this end is positioned close to the first beam but free at one end, so that it is insensitive to the pressure applied to the diaphragm, while being subject to the same temperature variations as the first beam. Additionally, the second beam is positioned sufficiently close to the first beam that it can be optically excited simultaneously with the first beam via a single optical fibre.

12 Claims, 1 Drawing Sheet

SOLID STATE SENSOR WITH DUAL RESONANT VIBRATABLE MEMBERS

This invention relates to sensors, and is more particularly but not exclusively concerned with semiconductor sensors in which the parameter to be sensed is arranged to affect the frequency of a resonantly vibrating element whose vibration is excited and sensed optically, and with optical sensing systems incorporating such semiconductor sensors.

Semiconductor (or solid state) sensors of the vibrating element type have already been proposed, for example in our United Kingdom Patent Application No. 8801238. Such sensors have a number of major advantages, particularly when made from single crystal silicon. Firstly, relatively complex miniature structures can be manufactured relatively inexpensively in large numbers, using well-established photolithographic, doping and micromachining techniques. Secondly, single crystal silicon has excellent engineering qualities, such as high stiffness-to-weight ratio and zero creep, which facilitate the fabrication of very high quality sensors.

However, a major problem with such sensors is temperature dependence. The main factor in the temperature dependence of the output of a silicon sensor of the vibrating element type is the temperature dependence of Young's modulus of silicon, which affects the resonant frequency of the vibrating element. Typically, the effective temperature coefficient of such a sensor is about 300 ppm/°C. for a sensor whose resonant frequency changes by 10% over its full operating pressure range, which is unacceptably high for high accuracy aerospace applications.

In general, the solution to the temperature dependence problem is to make a simultaneous temperature measurement, and to compensate the output of the sensor in accordance with a predetermined calibration function. Thus a temperature sensing resistance can be incorporated in the silicon of the sensor, and its resistance measured to determine the temperature of the sensor. However, in a sensor using optical excitation and sensing of the vibrating element, this solution is not practical, since it suffers from the drawback that separate electrical connections to the temperature sensing resistance are required, thus defeating one of the principal objects of optical excitation and sensing.

It is therefore an object of the present invention to provide a vibrating element solid state sensor in which this drawback of the known solution to the problem of temperature dependence is substantially alleviated.

According to the present invention, there is provided a solid state sensor for sensing a physical parameter, the sensor comprising:
  a first resonantly vibratable member formed in a substrate and arranged such that its frequency of vibration is dependent upon the parameter to be sensed; and
  a second resonantly vibratable member which is formed in the substrate adjacent to the first but which is arranged to be substantially insensitive to the parameter to be sensed;
  wherein both vibratable members are arranged to be optically excited into vibration via a common optical fibre.

Since both vibratable members are formed adjacent each other in the same material, their respective temperature coefficients of frequency will likely accurately track each other in a known (and therefore predictable) manner, thereby facilitating relatively easy temperature compensation. At the same time, the fact that the vibratable members are arranged to be optically excited, and optically interrogated as well if desired, via a common optical fibre avoids the need for separate electrical connections.

In a preferred embodiment of the invention, the first vibratable member comprises a first beam anchored in the sensor at each end thereof such that the tension therein is affected by the parameter to be sensed, while the second vibratable member comprises a second beam, in the form of a cantilever beam free at one end thereof. The second beam is preferably parallel to the first.

Preferably, the ends of the first beam are coupled to a diaphragm arranged to be subjected to a pressure or pressure difference constituting the parameter to be sensed.

The invention also encompasses a sensing system for sensing a physical parameter, the system comprising:
  a solid state sensor comprising a first resonantly vibratable member formed in a substrate and arranged such that its frequency of vibration is dependent upon a parameter to be sensed, and a second resonantly vibratable member which is formed in the substrate adjacent to the first but which is arranged to be substantially insensitive to the parameter to be sensed;
  an optical fibre;
  means for applying an optical input signal to the substrate via the optical fibre, to excite resonant vibration of the first and second vibratable members;
  means for deriving from the first and second vibratable members first and second optical signals respectively each representative of the frequency of vibration of a respective one of said members; and
  means responsive to the optical signals derived from the vibratable members to produce an output signal representative of said parameter and compensated for temperature changes of the vibratable members.

Both vibratable members may be arranged to have substantially equal temperature coefficients of frequency, in which case the output signal producing means may include means for producing said output signal in the form of a signal having a frequency equal to the difference between the respective vibration frequencies of said vibratable members.

Advantageously, the optical signals derived from the first and second vibratable members are both derived by the reflection of light from the members, the reflected light passing via the optical fibre to the output signal producing means as a composite optical signal comprising said first and second optical signals.

Figure 2:
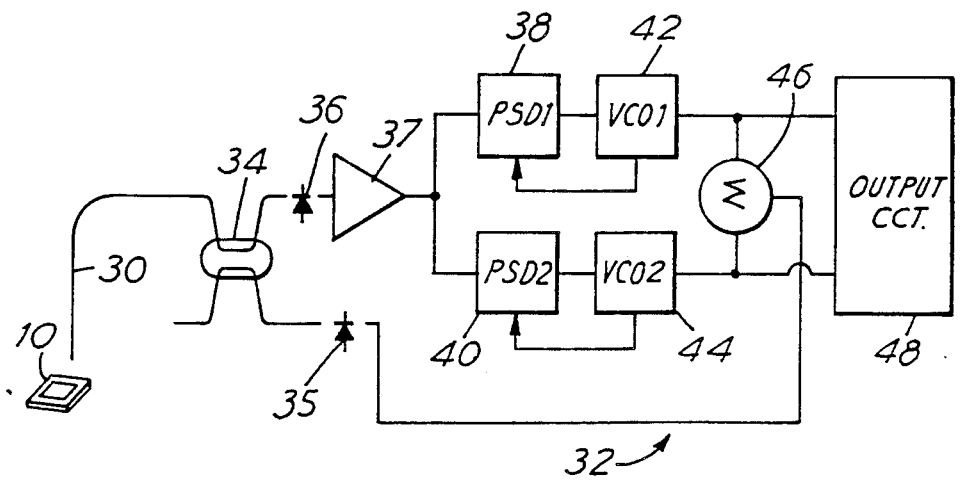

The invention will now be described, by way of example only, with reference to the accompanying drawings, of which:

FIG. 1 shows, somewhat schematically, a top view of a pressure sensor in accordance with the present invention; and FIG. 2 is a schematic block diagram of a pressure sensing system incorporating the sensor of FIG. 1.

The sensor of FIG. 1 is indicated generally at 10, and comprises a rectangular single crystal silicon substrate 12 having in its centre a pressure responsive diaphragm 14. Disposed in the centre of the diaphragm 14 are first and second closely spaced parallel beams 16,18 respectively: the first beam 16 extends between and interconnects two raised portions 20 provided on the diaphragm 14, while the second beam 18 is a cantilever beam extending from a single raised portion 22 provided on the diaphragm 14 (the other end of the beam 18 being free). Both of the beams 16,18 are resonantly vibratable, as will hereinafter become apparent. The diaphragm 14 and the beams 16,18 are all unitarily formed in or on the substrate 12 by photolithographic, doping and selective etching techniques (i.e. micromachining).

The beams 16,18 are typically about 500 micrometers long, 30 to 40 micrometers wide, and separated by a spacing of about 10 micrometers. They can thus both it within the area immediately beneath the outlet aperture of a single multimode optical fibre, which area is shown in dotted lines at 24 in FIG. 1 (the fibre itself being indicated at 30 in FIG. 2).

Both of the beams 16,18 are capable of resonant vibration when suitably optically excited via the optical fibre 30 of FIG. 2, as will hereinafter be described: the excitation mechanism can be local heating by light supplied by the optical fibre, an effect enhanced by coating each beam with a thin metal coating of a metal such as gold or chromium, or photopiezoelectric in response to light supplied by the optical fibre, an effect achieved by coating each beam with a material, such as zinc oxide, exhibiting surface piezoelectric effect. The respective resonant frequencies of the beams 16,18 are a function of their respective dimensions, which are selected such that the two resonant frequencies are not harmonically related: the resonant frequencies are also a function of temperature, by virtue of the temperature dependence of the Young's modulus of the silicon. Additionally, since the beam 16 is secured at each end to the diaphragm 14, its resonant frequency is a function of the tension in the beam, and thus a function in turn of the flexure of the diaphragm and therefore of the pressure to which the diaphragm is subjected.

As already mentioned, the sensor 10 is shown only schematically in FIG. 1: to complete it, the substrate 12 is mounted on a stress-isolating mounting in a hermetically sealed can or housing, so as to divide the housing into two separate regions which are sealed from each other. The region of the housing into which the side of the diaphragm 14 carrying the beams 16,18 faces is evacuated, while the region into which the other side of the diaphragm faces communicates with the pressure to be sensed via a pressure port in the housing. The optical fibre 30 enters the housing on the evacuated side, and terminates immediately above the beams 16,18 in alignment with the dotted area 24.

FIG. 2 shows the complete pressure sensing system based upon the sensor 10. The system is indicated generally at 32, and comprises an optical coupler 34 by means of which modulated light from a laser diode 35 can be coupled into the fibre 30, to excite the beams 16,18 of the sensor into resonant vibration. The coupler 34 also couples light reflected from the beams 16,18, which light is modulated at the respective vibration frequencies of the beams, from the optical fibre 30 onto a photodetector 36. The output of the photodetector 36 is connected via an amplifier 37 to respective first inputs of first and second phase sensitive detectors 38,40, whose outputs are connected to first and second voltage-controlled oscillators 42,44. The output of the voltage-controlled oscillator 42 is connected back to a second input of the phase sensitive detector 38, while the output of the voltage-controlled oscillator 44 is connected back to a second input of the phase-sensitive detector 38. Finally, the outputs of the voltage-controlled oscillators 42,44 are combined in a summing amplifier 46 and applied to the laser diode 35.

The range of operating frequencies of the voltage-controlled oscillator 42 is arranged to cover the full scale change in the resonant frequency of the beam 16 due to pressure and temperature, while the range of operating frequencies of the voltage-controlled oscillator 44 is arranged to embrace the full scale change in the resonant frequency of the beam 18 due to temperature: and the respective resonant frequencies of the beams are chosen such that these ranges do not overlap. In operation, therefore, and assuming both of the beams 16,18 have already started to vibrate because of the positive feedback provided around the loop between the detector 36 and the laser diode 35, light reflected by the beams 16,18 will contain modulation components at both resonant frequencies. These components will be detected by the detector 36, and applied to the phase-sensitive detectors 38,40.

Each of the phase-sensitive detectors 38,40 and its associated voltage-controlled oscillator 42, 44 acts as a phase locked loop to lock the respective oscillator 42 or 44 to the vibration frequency of the respective beam 16 or 18 to which that phase locked loop is effectively "tuned". Thus the voltage-controlled oscillator 42 produces an output signal at frequency $f_1$ equal to the vibration frequency of the beam 16, while the voltage controlled oscillator 44 produces an output signal at frequency $f_2$ equal to the vibration frequency of the beam 18. The frequency $f_1$ is a function both of the pressure applied to the sensor 10 and of the common temperature of the beams 16,18. The frequency $f_2$, on the other hand, is a function only of the common temperature of the beams 16,18, and can therefore be used to compensate the pressure measurement represented by the frequency $f_1$ for changes due solely to temperature. This compensation is effected in an output signal processing circuit 48, which may typically be a microprocessor.

The output of the summing amplifier 46 contains components at each of the frequencies $f_1$ and $f_2$, and so therefore does the light produced by the laser diode 35. This light is directed via the optical fibre 30 onto both of the beams 16,18, each of which effectively acts as a mechanical filter and thus responds only to the component modulated at its respective vibration frequency. The resonant vibration of each of the beams 16,18 is thus reinforced and sustained.

Several modifications can be made to the described embodiment of the invention.

In particular, separate laser diodes, having different output wavelengths, can be used to drive the beams 16,18 on the one hand, and to interrogate them on the other hand.

Further, although the beams 16,18 are described as being directly optically excited into resonant vibration via the common optical fibre 30 (i.e. they are both arranged to directly receive and absorb the modulated light serving as the excitation signal from the fibre 30), they can instead be indirectly excited into resonant vibration. This is achieved by directing the modulated light serving as the excitation signal onto another convenient part of the substrate 12, e.g. the diaphragm 14, where it creates thermal stresses which are transmitted through the substrate to the beams 16,18 to excite them into resonant vibration.

Also, although the beams 16,18 are described as parallel to each other, they can instead be perpendicular to each other, particularly if they are formed by cutting in a first substrate which is then fusion bonded to a second substrate containing the diaphragm 14 to form a unitary silicon structure, as described in U.S. patent application Ser. No. 358,771 (Barth et al) filed on May 30, 1989.

Additionally, the beams 16,18 can be arranged to have substantially equal temperature coefficients of frequency (in Hz per °C.), in which case the frequencies $f_1$ and $f_2$ can simply be applied to a mixer which forms a signal at the difference frequency $f_1-f_2$ (or a signal at this difference frequency can be derived from the signal at the output of the photodetector 36). This difference frequency is then representative solely of pressure (i.e. the temperature dependence is cancelled), and is applied to the output circuit 48 for the computation of pressure.

Finally, the references to "light" herein are to be understood as not restricted to visible light, but also to embrace infra red light and other radiation of suitable wavelength.

I claim:

1. A solid state sensor for sensing a physical parameter, the sensor comprising:
    a first resonantly vibratable member formed in a substrate and arranged such that its frequency of vibration is dependent upon the parameter to be sensed; and
    a second resonantly vibratable member which is formed in the substrate adjacent to the first but which is arranged to be substantially insensitive to the parameter to be sensed;
    wherein both vibratable members are arranged to be optically excited into vibration via a common optical fibre.

2. A sensor as claimed in claim 1, wherein the first vibratable member comprises a first beam anchored in the sensor at each end thereof such that the tension therein is affected by the parameter to be sensed, while the second vibratable member comprises a second beam, in the form of a cantilever beam free at one end thereof.

3. A sensor as claimed in claim 2, wherein the ends of the first beam are coupled to a diaphragm arranged to be subjected to a pressure or pressure difference constituting the parameter to be sensed.

4. A sensing system for sensing a physical parameter, the system comprising:
    a solid state sensor comprising a first resonantly vibratable member formed in a substrate and arranged such that its frequency of vibration is dependent upon a parameter to be sensed, and a second resonantly vibratable member which is formed in the substrate adjacent to the first but which is arranged to be substantially insensitive to the parameter to be sensed;
    an optical fibre;
    means for applying an optical input signal to the substrate via the optical fibre, to excite resonant vibration of the first and second vibratable members;
    means for deriving from the first and second vibratable members first and second optical signals respectively each representative of the frequency of vibration of a respective one of said members; and
    means responsive to the optical signals derived from the vibratable members to produce an output signal representative of said parameter and compensated for temperature changes of the vibratable members.

5. A sensing system as claimed in claim 4, wherein the first vibratable member comprises a first beam anchored in the sensor at each end thereof such that the tension therein is affected by the parameter to be sensed, while the second vibratable member comprises a second beam, in the form of a cantilever beam free at one end thereof.

6. A sensing system as claimed in claim 5, wherein the ends of the first beam are coupled to a diaphragm arranged to be subjected to a pressure or pressure difference constituting the parameter to be sensed.

7. A sensing system as claimed in claim 4, wherein the optical signals derived from the first and second vibratable members are both derived by the reflection of light from the members, the reflected light passing via the optical fibre to the output signal producing means as a composite optical signal comprising said first and second optical signals.

8. A sensing system as claimed in claim 4, wherein the output signal producing means comprises a photodetector coupled to receive the optical signals derived from the members, and first and second phase locked loops coupled to the output of the photodetector and each arranged to lock to the vibration frequency of a respective one of the members.

9. A sensing system as claimed in claim 8, wherein the applying means comprises a summing amplifier connected to receive and sum the respective outputs of the phase locked loops, and a light emitting device driven by the summing amplifier.

10. A sensing system as claimed in claim 9, wherein the light emitting device is a laser diode.

11. A sensing system as claimed in claim 4, wherein the vibratable members are arranged to have substantially equal temperature coefficients of frequency, and the output signal producing means includes means for producing said output signal in the form of a signal having a frequency equal to the difference between the respective vibration frequencies of said vibratable members.

12. A sensing system as claimed in claim 4, wherein the optical fibre is arranged to direct the optical input signal directly onto the vibratable members for absorption thereby and direct excitation thereof.

* * * * *